(No Model.)

G. L. WILEY & E. G. ACHESON.
JOINT FOR ELECTRIC CONDUCTORS.

No. 433,922. Patented Aug. 5, 1890.

United States Patent Office.

GEORGE L. WILEY, OF ARLINGTON, NEW JERSEY, AND EDWARD G. ACHESON, OF PITTSBURG, PENNSYLVANIA, ASSIGNORS TO THE STANDARD UNDERGROUND CABLE COMPANY, OF PITTSBURG, PENNSYLVANIA.

JOINT FOR ELECTRIC CONDUCTORS.

SPECIFICATION forming part of Letters Patent No. 433,922, dated August 5, 1890.

Application filed March 27, 1890. Serial No. 345,570. (No model.)

*To all whom it may concern:*

Be it known that we, GEORGE L. WILEY and EDWARD G. ACHESON, citizens of the United States, residing, respectively, at Arlington, in the county of Hudson and State of New Jersey, and at Pittsburg, Allegheny county, State of Pennsylvania, have invented certain new and useful Improvements in Joints for Electric Conductors, of which the following is a specification.

Our invention is a joint for electric conductors, especially for that class of conductors which are provided with a metallic covering—usually of lead—and are adapted for the passage of currents of high tension. It is well known that the greater part of the difficulties met with in obtaining high values of insulation in such conductors is due to leakages at or about the joints or places where connections are made between different portions of the conductor. In order to obviate these troubles and to insure perfect insulation at these points, much effort and labor have been expended.

Our present invention provides a joint which we have found to be safe, cheap, and efficient, and capable of producing the desired efficiency of insulation, and we have illustrated the same in the accompanying drawings, in which—

Figure 1:
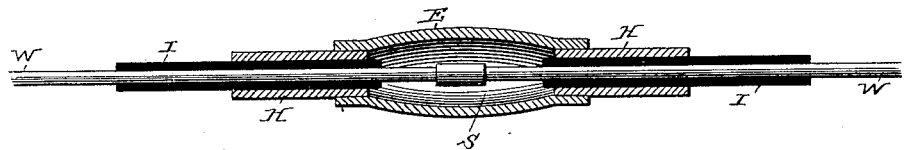
Figure 2:
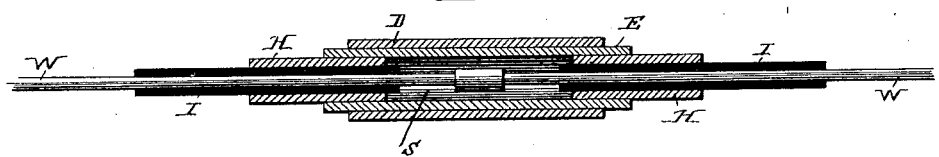
Figure 3:
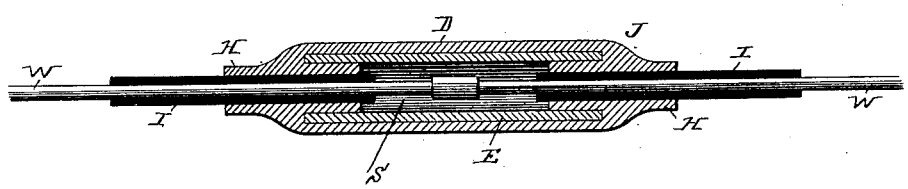
Figure 4:
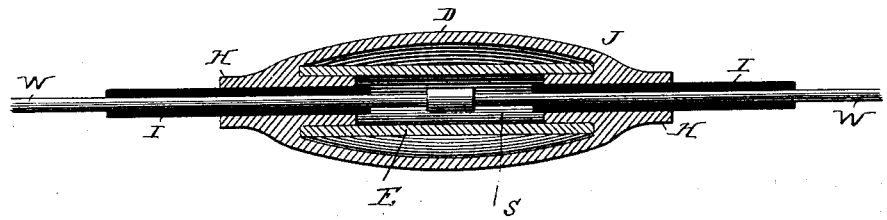

Figure 1 is a sectional view of a cable arranged according to our invention. Fig. 2 is a similar view of a joint provided with a protecting device. Fig. 3 is a similar view showing a manner of connecting the protecting device with the metal of the cable, and Fig. 4 is a modification of the same.

In the drawings, W W represents a metallic electric conductor, which may be of any desired form or construction, the adjacent ends of the sections of the cable being united electrically in a well-known way. The insulating material I surrounding these conductors is removed from the ends of the cables for a certain distance, leaving the conductor bare, and the usual metal or protecting covering H of the conductor is also removed. Before the ends are joined a tube E or other hollow section of porcelain, vulcabeston, hard rubber, papier-maché, or other suitable non-conductor is slipped over one end of one of the cables, and after the junction of the conductors is effected this tube is slipped over the junction so as to bear upon the metal covering H of each end of the adjacent cable. This tube may be made to fit tightly over the metal covering, or, if necessary, some insulating material may be interposed between the tube and the metal covering to complete and effect the union.

The conductors W between the adjacent ends of the cables may be insulated by winding with tape or covered and surrounded by other insulating material, so as to fill the space S, or, if preferred, it may be left vacant. In order to protect this tube from breakage in places where it is exposed, we provide a metal tube or sleeve D, which may be of lead or other similar material and which acts as a mechanical protector to the sleeve of insulating material.

In Fig. 2 we have shown this mechanical protecting-sleeve simply fitting over the insulating-sleeve E.

In Fig. 3 we have shown the sleeve D as consisting preferably of a section of lead pipe or similar material, fitting over the insulating-tube and connected to the protecting-covering H of the cable by means of a wiped joint J at both ends. In this way the insulated tube is fully covered throughout and a neat finish and joint are made.

In Fig. 4 we have shown the mechanical protecting-tube D as being somewhat larger than the insulating-tube E, leaving a space between the two, and the protecting-tube is connected to the metallic protecting-covering of the cable by a wiped joint J, as before. We have found that this construction is a safe joint, in that all moisture is prevented from reaching the conductors, and when the protector is used it is not liable to be broken or destroyed under any of the ordinary conditions to which it is exposed.

What we claim is—

1. A joint for electric conductors in which the insulated and protected conductor is exposed at its adjacent ends and the ends of the cable are joined by a sleeve of insulating material closely fitting the metallic coating at the adjacent ends of the cable, substantially as described.

2. A joint for electric conductors in which the insulated and protected conductor is exposed at its adjacent ends and the ends of the cable are joined by a sleeve of insulating material closely fitting the metallic coating, and a metallic protective sleeve covering the insulating-sleeve, substantially as described.

3. A joint for electric conductors in which the insulated and protected conductor is exposed at its adjacent ends and the ends of the cable are joined by a sleeve of insulating material closely fitting the metallic coating, the protective sleeve surrounding the metallic covering of the cable and united thereto by a metallic union, substantially as described.

4. A joint for electric conductors in which the insulated and protected conductor is exposed at its adjacent ends and the ends of the cable are joined by a sleeve of insulating material closely fitting the metallic coating, the protective sleeve surrounding the metallic covering at a distance therefrom, leaving a space between the two, substantially as described.

In testimony whereof we have signed our names to this specification in the presence of two subscribing witnesses.

GEORGE L. WILEY.
EDWARD G. ACHESON.

Witnesses:
W. D. UPTEGRAFF,
THOS. F. O'CONNOR.